(12) United States Patent
Michels et al.

(10) Patent No.: US 8,112,491 B1
(45) Date of Patent: Feb. 7, 2012

(54) METHODS AND SYSTEMS FOR PROVIDING DIRECT DMA

(75) Inventors: Timothy Michels, Greenacres, WA (US); William R. Baumann, Seattle, WA (US); Paul I. Szabo, Shoreline, WA (US)

(73) Assignee: F5 Networks, Inc., Seattle, WA (US)

( * ) Notice: Subject to any disclaimer, the term of this patent is extended or adjusted under 35 U.S.C. 154(b) by 0 days.

(21) Appl. No.: 12/690,069

(22) Filed: Jan. 19, 2010

Related U.S. Application Data

(60) Provisional application No. 61/205,384, filed on Jan. 16, 2009.

(51) Int. Cl.
 *G06F 15/167* (2006.01)
 *G06F 13/28* (2006.01)
(52) U.S. Cl. .......................... 709/212; 710/52
(58) Field of Classification Search .......... 709/212–214, 709/217–219, 227, 250–253; 710/22, 52, 710/56, 59
 See application file for complete search history.

(56) References Cited

U.S. PATENT DOCUMENTS

| | | | |
|---|---|---|---|
| 5,941,988 A | 8/1999 | Bhagwat et al. | |
| 6,026,443 A | 2/2000 | Oskouy et al. | |
| 6,700,871 B1 | 3/2004 | Harper et al. | |
| 6,748,457 B2 | 6/2004 | Fallon et al. | |
| 6,820,133 B1 | 11/2004 | Grove et al. | |
| 7,065,630 B1 | 6/2006 | Ledebohm et al. | |
| 7,107,348 B2 | 9/2006 | Shimada et al. | |
| 7,142,540 B2 * | 11/2006 | Hendel et al. | 370/392 |
| 7,281,030 B1 | 10/2007 | Davis | |
| 7,324,525 B2 | 1/2008 | Fuhs et al. | |
| 7,376,772 B2 | 5/2008 | Fallon | |
| 7,403,542 B1 * | 7/2008 | Thompson | 370/474 |
| 7,420,931 B2 * | 9/2008 | Nanda et al. | 370/252 |
| 7,478,186 B1 | 1/2009 | Onufryk et al. | |
| 7,496,695 B2 | 2/2009 | Go et al. | |
| 7,500,028 B2 | 3/2009 | Yamagishi | |
| 7,647,416 B2 * | 1/2010 | Chiang et al. | 709/230 |
| 7,735,099 B1 | 6/2010 | Micalizzi, Jr. | |

(Continued)

FOREIGN PATENT DOCUMENTS

EP 1813084 A1 8/2007

(Continued)

OTHER PUBLICATIONS

Bell Laboratories, "Layer 4/7 Switching and Other Custom IP Traffic Processing Using the NEPPI API," Bell Laboratories, Lucent Technologies, Murray Hill, NJ 07974 USA, pp. 1-11 (2000).

(Continued)

*Primary Examiner* — Yemane Mesfin
(74) *Attorney, Agent, or Firm* — LeClairRyan

(57) ABSTRACT

A method and system for efficient direct DMA for processing connection state information or other expediting data packets. One example is the use of a network interface controller to buffer TCP type data packets that may contain connection state information. The connection state information is extracted from a received packet. The connection state information is stored in a special DMA descriptor that is stored in a ring buffer area of a buffer memory that is accessible by a host processor when an interrupt signal is received. The packet is then discarded. The host processor accesses the ring buffer memory only to retrieve the stored connection state information from the DMA descriptor without having to access a packet buffer area in the memory.

19 Claims, 5 Drawing Sheets

U.S. PATENT DOCUMENTS

| | | | |
|---|---|---|---|
| 7,742,412 | B1 | 6/2010 | Medina |
| 7,784,093 | B2 | 8/2010 | Deng et al. |
| 7,826,487 | B1 | 11/2010 | Mukerji et al. |
| 7,877,524 | B1 | 1/2011 | Annem et al. |
| 2002/0143955 | A1 | 10/2002 | Shimada et al. |
| 2003/0067930 | A1 | 4/2003 | Salapura et al. |
| 2003/0204636 | A1 | 10/2003 | Greenblat et al. |
| 2004/0249948 | A1 | 12/2004 | Sethi et al. |
| 2005/0083952 | A1 | 4/2005 | Swain |
| 2006/0104303 | A1 | 5/2006 | Makineni et al. |
| 2006/0221832 | A1 | 10/2006 | Muller et al. |
| 2006/0221835 | A1 | 10/2006 | Sweeney |
| 2008/0126509 | A1 | 5/2008 | Subramanian et al. |
| 2009/0016217 | A1 | 1/2009 | Kashyap |

FOREIGN PATENT DOCUMENTS

| | | |
|---|---|---|
| WO | 2006/055494 A1 | 5/2006 |

OTHER PUBLICATIONS http://lwn.net/images/pdf/LDD3/ch15.pdf, "Memory Mapping and DMA," Chapter 15, pp. 412-463 (Jan. 2005).

EVENTHELIX.com, "DMA and Interrupt Handling," at http://www.eventhelix.com/RealtimeMantra/FaultHandling/dma_interrupt_handling.htm (Downloaded Oct. 2009).

EVENTHELIX.com, "TCP-Transmission Control Protocol (TCP Fast Retransmit and Recovery)," (Mar. 2002).

Harvey, "DMA Fundamentals on Various PC Platforms," National Instruments, Application Note 011, pp. 1-18 (Apr. 1991).

Mangino, "Using DMA with High Performance Peripherals to Maximize System Performance," WW TMS470 Catalog Applications, at http://focus.ti.com/lit/wp/spna105/spna105.pdf (Jan. 2007).

Mogul, "The Case for Persistent-Connection HTTP," SIGCOMM, Cambridge, MA USA pp. 299-313 (Oct. 1995).

Rabinovich et al., "DHTTP: An Efficient and Cache-Friendly Transfer Protocol for the Web," IEEE/ACM Transactions on Networking 12(6):1007-20 (Dec. 2004).

Stevens, "TCP Slow Start, Congestion Avoidance, Fast Retransmit, and Fast Recovery Algorithms," Standards Track Memo pp. 1-6 (Jan. 1997).

Wadge, "Achieving Gigabit Performance on Programmable Ethernet Network Interface Cards," pp. 1-9 (May 2001).

Welch, "A User's Guide to TCP Windows," pp. 1-5 (Jun. 1996).

Wikipedia, "Direct Memory Access," at http://en.wikipedia.org/wiki/Direct_memory_access, pp. 1-6 (Downloaded Oct. 2009).

Wikipedia, "Nagle's Algorithm," at Nagle's Algorithm—Wikeopedia.xps (Last Modified Oct. 2009).

"Cavium Networks Product Selector Guide—Single & Multi-Core MIPS Processors, Security Processors and Accelerator Boards," at www.caviumnetworks.com, Spring 2008, pp. 1-44, Cavium Networks, Mountain View, CA, US.

"Comtech AHA Announces 3.0 Gbps GZIP Compression/Decompression Accelerator—AHA362-PCIX offers high-speed GZIP compression and decompression," at www.aha.com, Apr. 20, 2005, pp. 1-2, Comtech AHA Corporation, Moscow, ID, USA.

"Comtech AHA Announces GZIP Compression and Decompression IC—Offers the highest speed and compression ratio performance in hardware on the market," at www.aha.com, Jun. 26, 2007, pp. 1-2, Comtech AHA Corporation, Moscow, ID, USA.

"Gigabit Ethernet/PCI Network Interface Card; Host/NIC Software Interface Definition," Jul. 1999, pp. 1-80, Revision 12.4.13, P/N 020001, Alteon WebSystems, Inc., San Jose, California.

"NITROX™ XL Security Acceleration Modules—PCI 3V or 3V/5V-Universal Boards for SSL and IPSec," at http://www.Caviumnetworks.com, 2002, pp. 1, Cavium Networks, Mountain View, CA USA.

"PCI, PCI-X," at http://www.cavium.com/acceleration_boards_PCI_PCI-X.htm, downloaded Oct. 2008, Cavium Networks—Products > Acceleration Boards > PCI, PCI-X.

"Plan 9 kernel history: overview / file list / diff list," <http://switch.com/cgi-bin/plan9history.cgi?f=2001/0126/pc/etherga620.com>, accessed Oct. 22, 2007, pp. 1-16.

* cited by examiner

METHODS AND SYSTEMS FOR PROVIDING DIRECT DMA

The present application claims the benefit of U.S. Provisional Patent Application Ser. No. 61/205,384, filed on Jan. 16, 2009, entitled "Methods and Systems for Direct DMA", which is hereby incorporated by reference in its entirety.

TECHNICAL FIELD

The present disclosure generally relates to packet transmission for networks and more particularly, to a system and method for use of direct DMA for efficient packet transmission between a network interface controller and a host processor.

BACKGROUND

The use of server-based applications for remote clients over a network has become ubiquitous. With the widespread use of diverse server applications, different needs for devices such as a network interface controller to facilitate data received through the network to the server have arisen. The function of such a network interface controller is to process a direct memory access (DMA) to store received packets over the network and notify the host processor via an interrupt of the stored information. Since interrupts are computationally expensive, it is desirable to interrupt a processor on a server only when necessary and network interface controllers are designed to optimize this process.

Currently, the DMA is the method by which a host processor accesses stored network packets after receiving interrupts from the network interface controller of a network traffic management device. The DMA of a packet to the host processor involves the network interface controller writing a received packet into a packet buffer area in the host memory in which the host processor accesses the host memory to retrieve information contained in the received data packets. The packet buffer is randomly accessible by the host processor, but requires greater processing resources and is generally a slower access because the packet buffer area is typically DRAM. Typically, a descriptor with a pointer to the packet buffer area is written into a ring buffer area, whereby the ring buffer area is smaller than the packet buffer area and allows for faster access by the host processor. Once the descriptor is written into the ring buffer area, the host processor is notified and the host processor then reads the descriptor in the ring buffer area to retrieve the packet buffer pointer. The host processor then reads the stored data packet from the location, indicated by the pointer, in the packet buffer area and reads the contents of the data packet.

Packets received and processed by the host processor are frequently TCP packets, many of which generally contain only connection state information and have no payload or attached data. Such TCP packets are typically SYN, ACK, FIN and RESET packets. A TCP packet having connection state information, which includes a few flags and fields, is very small relative to the overall size of a TCP packet with attached payload data. Current systems which handle packets with connection state information as well as packets with payload data are inefficient because the host processor cannot distinguish between the two different types of packets. This results in the host processor having to access the descriptor in the ring buffer area and then access the packet buffer area in order to just to receive the connection state information in many TCP packets. This results in a significant use of computational and processing resources for the host processor to access the packet buffer area to only process connection state information of a TCP packet. The inefficiency is compounded by the fact that the access to the packet buffer area is likely to be a CPU cache miss resulting in an expensive DRAM memory access.

SUMMARY

In an aspect, a method for efficiently processing a received data packet comprises reading a received data packet to determine if the data packet contains connection state information. The connection state information is extracted from the data packet if the data packet contains the connection state information. The extracted connection state information is stored as a special DMA descriptor in a ring buffer memory accessible by a host processor. The host processor is notified that the special DMA descriptor has been stored in the ring buffer memory. The host processor is then able to immediately access the ring buffer memory to retrieve the stored connection state information from the special DMA descriptor.

In another aspect, a computer or other machine readable medium having stored thereon instructions for efficiently processing a received data packet comprising reading a received data packet to determine if the data packet contains connection state information. Connection state information is extracted from the data packet if the data packet contains the connection state information. The extracted connection state information is stored as a special DMA descriptor in a ring buffer memory accessible by a host processor. The host processor is notified that the special DMA descriptor has been stored in the ring buffer memory, wherein the host processor is able to immediately access the ring buffer memory to retrieve the stored connection state information from the special DMA descriptor.

In yet another aspect, a network traffic management device includes one or more processors, a memory coupled to the one or more processors by a bus, and a network interface controller coupled to the one or more processors and the memory and be capable of receiving and forwarding data packets from a network that relate to a plurality of applications. At least one of the one or more processors is configured to execute programmed instructions stored in the memory and one or more processors with logic is configured to implement reading a received data packet to determine if the data packet contains connection state information. The connection state information is extracted from the data packet if the data packet contains the connection state information. The connection state information is stored as a special DMA descriptor in a ring buffer memory configured to be accessible by a host processor. The host processor is notified that the special DMA descriptor has been stored in the ring buffer memory and is able to immediately access the ring buffer memory to retrieve the stored connection state information from the special DMA descriptor.

Additional aspects will be apparent to those of ordinary skill in the art in view of the detailed description of various embodiments, which is made with reference to the drawings, a brief description of which is provided below.

DETAILED DESCRIPTION

Currently, existing network interface controllers and host processors require unnecessary access to packet buffer area memory for TCP packets with connection state information or other types of information which are to be immediately consumed by the host processor. The access to buffer memory for such TCP packets consumes significant host processor resources and results in slower processing of the packets. The described technology reduces this by allowing the network interface controller of the network traffic management device to provide DMA services to the host processor via one or more DMA channels in which the one or more DMA channels supports the movement of data traffic between the network traffic management device and the host processor main memory system.

Figure 1:
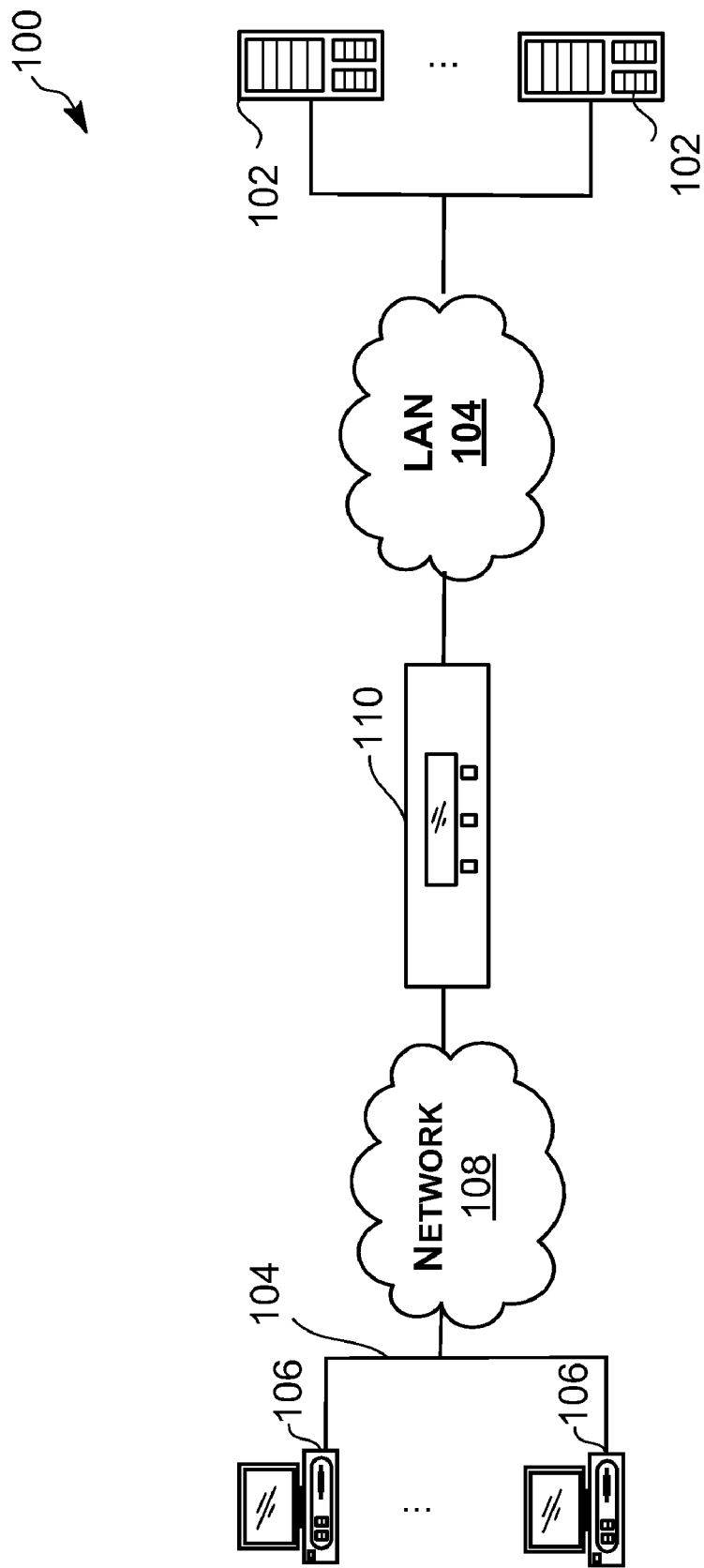
FIG. 1 is a block diagram of a network system using one example of a network interface controller using a direct DMA process.

Referring now to FIG. 1, an example system environment 100 employs a network traffic management device (also referred to as "traffic management device") 110 that includes a network interface controller and one or more processors capable of manipulating those data packets that have connection state information and applying DMA for those data packets. In applying DMA to the data packets with connection state information, a special descriptor is written into the ring buffer area in a buffer memory in the network traffic management device 110. The network interface controller within the network traffic management device 110 notifies one or more host processors of this special descriptor in which the host processor accesses the ring buffer and processes the special descriptor immediately. The host processor is thereby able to quickly obtain the connection status information without having to access the packet buffer memory.

The example system environment 100 includes one or more servers 102 (e.g., Web application servers), one or more client devices 106 and the traffic management device 110, although the environment 100 can include other numbers and types of devices in other arrangements. The traffic management device 110 is coupled to the servers 102 via local area network (LAN) 104 and client devices 106 via a network 108. Generally, requests sent over the network 108 from client devices 106 towards servers 102 are handled by the traffic management device 110.

Client devices 106 comprise computing devices capable of connecting to other computing devices, such as network traffic management device 110 and servers 102. Communications between the client devices 106, network traffic management device 110 and servers 102 occur over wired and/or wireless networks, such as network 108, to send and receive data. Non-limiting and non-exhausting examples of such devices include personal computers (e.g., desktops, laptops), mobile and/or smart phones and the like. In this example, client devices 106 run Web browsers that may provide an interface for operators, such as human users, to interact with for making requests for resources to different web server-based applications or Web pages via the network 108, although other server resources may be requested by clients. One or more Web-based applications may run on the server 102 that provide the requested data back to one or more exterior network devices, such as client devices 106.

Network 108 comprises a publicly accessible network, such as the Internet in this example, although the network 108 may comprise other types of private and public networks that include other devices. Communications, such as requests from clients 106 and responses from servers 102, take place over the network 108 according to standard network protocols, such as the HTTP and TCP/IP protocols in this example. However, the principles discussed herein are not limited to this example and can include other protocols. For instance, network 108 may provide responses and requests according to the HTTP-based application RFC protocol or the CIFS or NFS protocol in an example.

Further, it should be appreciated that network 108 may include local area networks (LANs), wide area networks (WANs), direct connections and any combination thereof, as well as other types and numbers of network types. On an interconnected set of LANs or other networks, including those based on differing architectures and protocols, routers, switches, hubs, gateways, bridges, and other intermediate network devices may act as links within and between LANs and other networks to enable messages and other data to be sent to and from the network devices. Also, communication links within and between LANs and other networks typically include twisted wire pair (e.g., Ethernet), coaxial cable, analog telephone lines, full or fractional dedicated digital lines including T1, T2, T3, and T4, Integrated Services Digital Networks (ISDNs), Digital Subscriber Lines (DSLs), wireless links including satellite links and other communications links known to those skilled in the relevant arts. In essence, the network 108 includes any communication medium and method by which data may travel between the client devices 106, the servers 102 and the network traffic management device 110, and these are provided by way of example only.

LAN 104 comprises a local area network that includes the network traffic management device 110 coupled to the one or more servers 102. However, the LAN 104 may comprise other types of private and public networks with other devices. Networks, including local area networks, besides being understood by those skilled in the relevant arts, have already been generally described above in connection with network 108 and will not be described further here.

Server 102 comprises one or more server computing machines capable of operating one or more applications (e.g., Web-based applications) that may be accessed by network devices in the network 108, such as client devices 106, via the network traffic management device 110, and may provide other data representing requested resources, such as particular web page(s), image(s) of physical objects, and any other objects, responsive to the requests, although the server 102 may perform other tasks and provide other types of resources. It should be noted that while only two servers 102 are shown in the environment 100 depicted in FIG. 1, other numbers and types of servers may be coupled to the network traffic management device 110. It is also contemplated that one or more of the Web application servers 102 may be a cluster of servers managed by the network traffic management device 110.

As per the TCP/IP protocols, requests from the requesting client devices 106 may be sent as one or more streams of data packets over network 108 to the traffic management device 110 and/or the servers 102 to establish connections, send and receive data for existing connections, and for other purposes. With other protocols, such as the ICMP protocol, data packets may be sent which indicate that an error has occurred or that a specific event is to be immediately consumed by the traffic management device 110. It is to be understood that the one or more servers 102 may be hardware and/or software, and/or may represent a system with multiple servers that may include internal or external networks. In this example, the servers 102 may be any version of Microsoft° IIS servers or Apache° servers, although other types of servers may be used. Further, additional servers may be coupled to the network 108 and many different types of applications may be available on servers coupled to the network 108.

Each of the servers 102 and client devices 106 may include one or more central processing units (CPUs), one or more computer readable media (i.e., memory), and interface systems that are coupled together by internal buses or other links as are generally known to those of ordinary skill in the art; as such, they will not be described further here.

As shown in the example environment 100 depicted in FIG. 1, the network traffic management device 110 is interposed between client devices 106 in network 108 and servers 102 in LAN 104 in an asymmetric configuration, although other numbers of network traffic management devices 110 can be used, such as a symmetric configuration. Again, the environment 100 could be arranged in other manners with other numbers and types of devices. Also, the network traffic management device 110 is coupled to the network 108 by one or more network communication links and intermediate network devices, such as routers, switches, gateways, hubs and other devices (not shown). It should be understood the devices and the particular configuration shown in FIG. 1 are provided for exemplary purposes only and are therefore not limiting.

Generally, the network traffic management device 110 manages network communications, which may include one or more client requests and server responses, from/to the network 108 between the client devices 106 and one or more of the servers 102 via the LAN 104. These requests may be destined for one or more servers 102, and for example, may take the form of one or more TCP/IP data packets originating from the network 108, passing through one or more intermediate network devices and/or intermediate networks, until ultimately reaching the traffic management device 110. In any case, the network traffic management device 110 may manage the network communications by performing several network traffic related functions involving the communications, in particular direct DMA for efficient packet transmission and access. It should be noted that although TCP data packets are referred to herein, other network and/or non-network based protocols are contemplated. For instance, the data packets that are processed and manipulated by the network traffic management device may be RTSP control frames, SETP protocols, UDP, ICMP or any other protocol which requires DMA of state information without bulk or payload data or requires that the data packet be consumed immediately.

Figure 2:
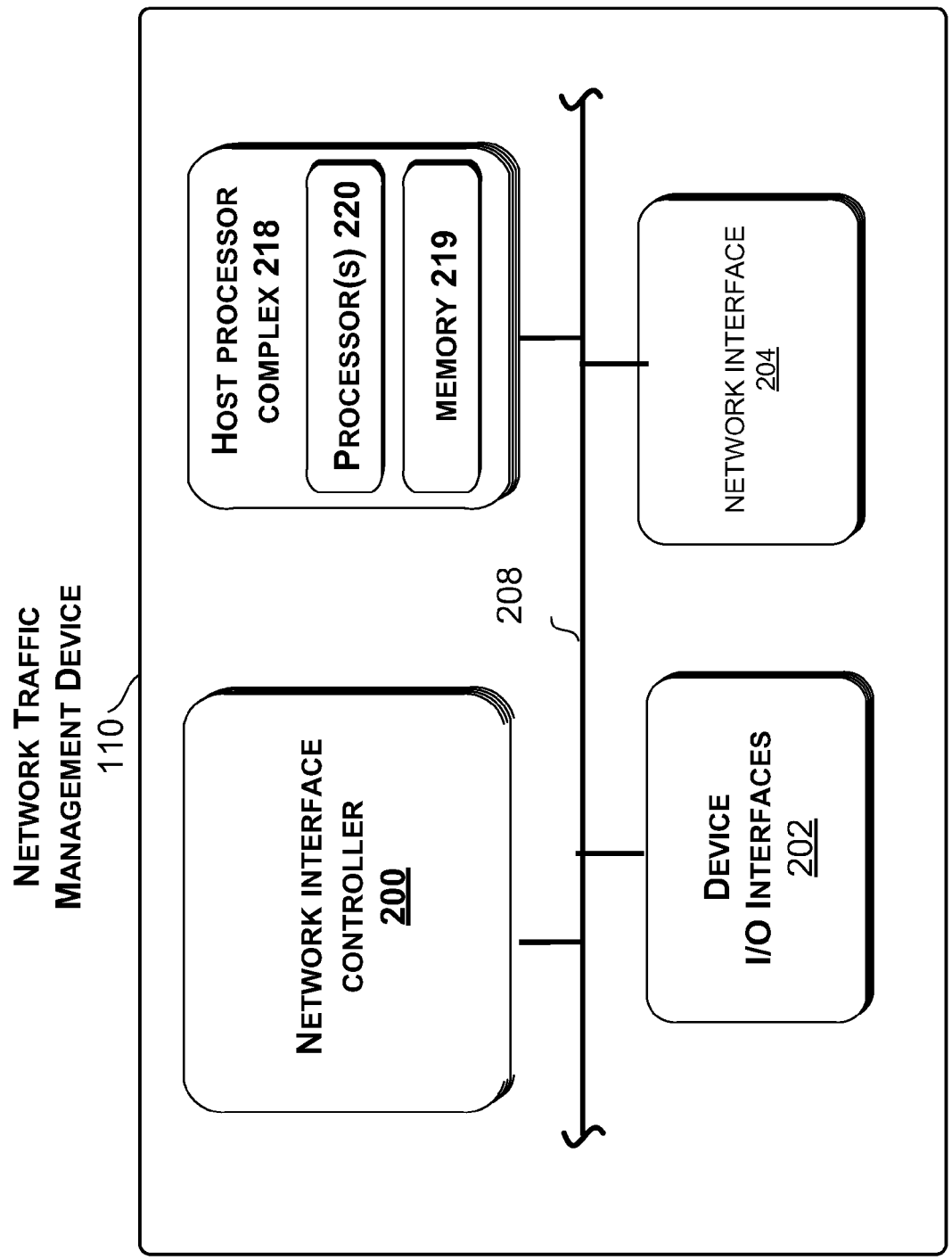
FIG. 2 is a block diagram of the example network traffic management device in FIG. 1 that uses a direct DMA process to allow efficient processing of packets.
Figure 3:
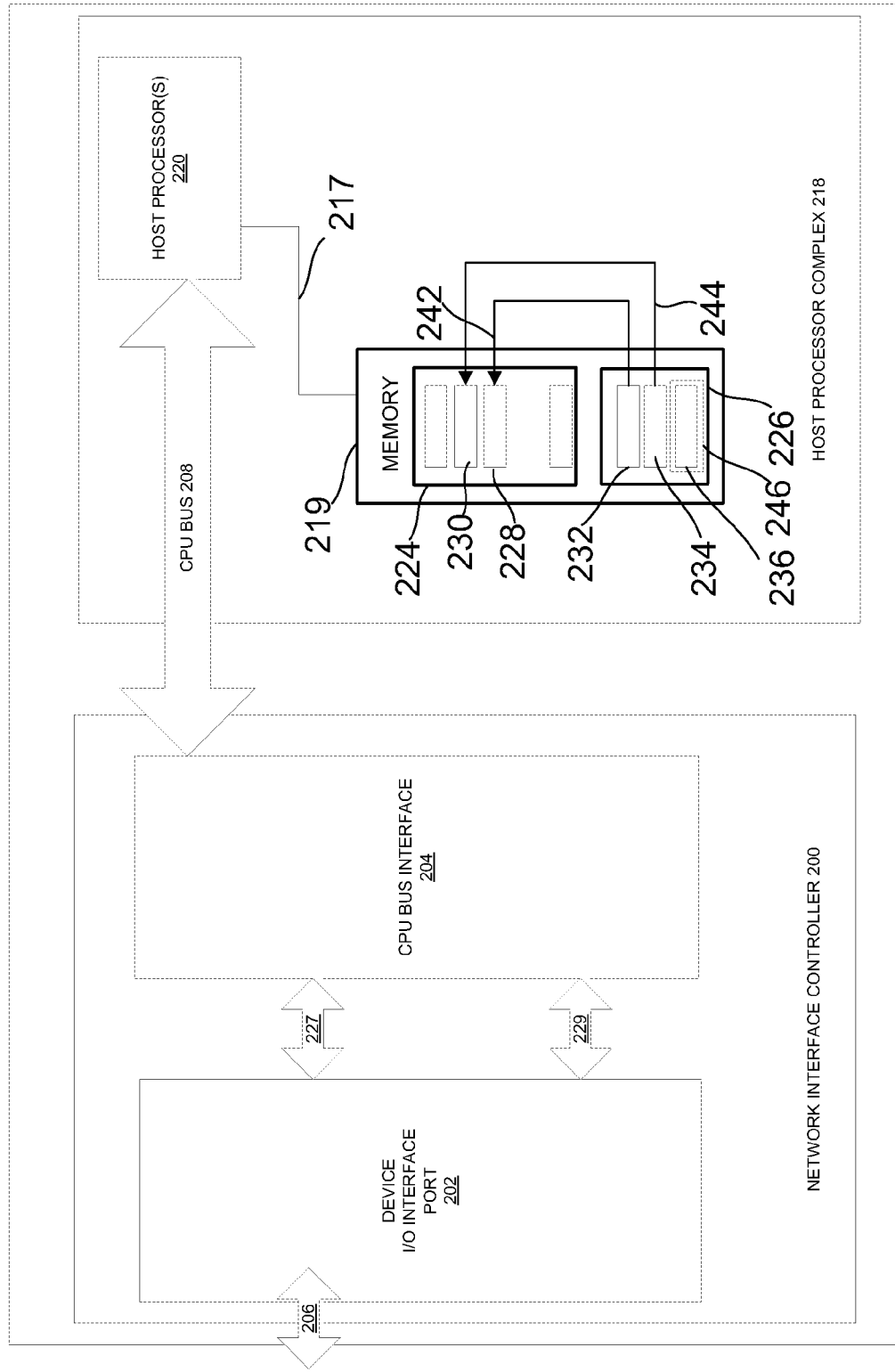
FIG. 3 is a detailed block diagram of the example network traffic management device in FIG. 1 that uses a direct DMA process to allow efficient processing of packets.

Referring now to FIG. 2, an example network traffic management device 110 includes a network interface controller 200, one or more device I/O interfaces 202, and a host processor complex 218, which are coupled together by bus 208, although the device 110 could include other types and numbers of components. As will be discussed in more detail below, the host processor complex 218 desirably includes one or more host processors 220 as well as a memory (also referred to herein as buffer memory) 219 which will be discussed in more detail below. The one or more host processors 220, as discussed in FIG. 3, are configured to execute computer/machine readable and executable instructions stored in device memory 219 to implement network traffic management related functions of the network traffic management device 110, including the technology described and illustrated herein. It should be noted that although more than one host processor 220 may be present in the network traffic management device 110, "a host processor" is referred to herein for clarity purposes and can be construed as meaning one or more host processors.

The host processor 220 comprises logic to configured to execute one or more aspects of the technology described herein, although other manners for implementing this technology can be used. The host processor 220 may, by way of example only, comprise other types and/or combinations of application specific integrated circuits ("ASICs"), programmable logic devices ("PLDs"), field programmable logic devices ("FPLDs"), field programmable gate arrays ("FPGAs"), and the like, programmed or configured according to the teachings as described and illustrated herein. As shown in FIGS. 2 and 3, the network traffic management device 110, through use of the network interface controller 200 and the host processor complex 218, manipulates the data packets and communicates with the server 102 to achieve efficient processing of the data packets with connection state information, event information, error messages, or other information which is to be consumed immediately by the host processor 220.

Device I/O interfaces 202 comprise one or more user input and output device interface mechanisms, such as a computer keyboard, mouse, display device, and the corresponding physical ports and underlying supporting hardware and software to enable the network traffic management device 110 to communicate with the outside environment for accepting user data input and to provide user output, although other types and numbers of user input and output devices may be used. Alternatively or additionally, the network traffic management device 110 may communicate with the outside environment for certain types of operations (e.g., configuration) via a network management port, for example.

Network interface 204 comprises one or more mechanisms that enable network traffic management device 110 to engage in TCP/IP communications over LAN 104 and network 108. However, the network interface 204 may be constructed for use with other communication protocols and types of networks. Network interface 204 is sometimes referred to as a transceiver, transceiving device, or network interface card (NIC). The network interface 204 transmits and receives network data packets to one or more networks, such as LAN 104 and network 108 in this example.

The network interface controller 200 executes and controls the direct DMA to the buffer memory 219 and communicates with the host processor 220 in the network traffic management device 110. In an aspect where the network traffic management device 110 includes more than one network interface controller 200 (or a network interface controller 200 that has more than one core), each network interface controller 200 (and/or core) may use the same single network interface 204 or a plurality of network interfaces 204. Further, the network interface 204 may include one or more physical ports, such as Ethernet ports, to couple the network traffic management device 110 with other network devices, such as servers 102. Moreover, the network interface 204 may include certain physical ports dedicated to receiving and/or transmitting certain types of network data, such as device management related data for configuring the network traffic management device 110.

Bus 208 may comprise one or more internal device component communication buses, links, bridges and supporting components, such as bus controllers and/or arbiters. The bus 208 enables the various components of the network traffic management device 110, such as the network interface controller 200, device I/O interfaces 202, network interface 204, one or more processors 220 and a device or buffer memory 218, to communicate. It should be noted that the bus 208 may enable one or more components of the network traffic management device 110 to communicate with components in other devices as well. By way of example only, the bus 208 may include HyperTransport, PCI, PCI Express, InfiniBand, USB, Firewire, Serial ATA (SATA), SCSI, IDE and AGP buses, although other types and numbers of buses may be used and the particular types and arrangement of buses will depend on the particular configuration of the network traffic management device 110.

The buffer memory 219, in general, comprises computer readable media, namely computer readable or processor readable storage media, which are examples of machine-readable storage media. Computer readable storage/machine-readable storage media may include volatile, nonvolatile, removable, and non-removable media implemented in any method or technology for storage of information. Such media examples include computer readable/machine-executable instructions, data structures, program modules, or other data, which may be obtained and/or executed by one or more processors, such as one or more host processors 220. The one or more host processors 220 and/or the network interface controller 200 may perform actions, including implementing an operating system for controlling the general operation of network traffic management device 110 to manage network traffic and provide direct DMA for efficient packet transmission as described herein.

Examples of computer readable storage media include RAM, BIOS, ROM, EEPROM, flash/firmware memory or other memory technology, CD-ROM, digital versatile disks (DVD) or other optical storage, magnetic cassettes, magnetic tape, magnetic disk storage or other magnetic storage devices. Computer readable storage media may be any other medium which can be used to store the desired information, including data and/or computer/machine-executable instructions, and which can be accessed by a computing or specially programmed device, such as network traffic management device 110. When the instructions stored in the buffer memory 219 are run by the one or more host processors 220, the network traffic management device 110 performs at least a portion of the processes in described herein as well as other various network traffic management related functions, including firewall functions, server load balancing functions, device configuration functions (e.g., defining network security policies), and other functions.

FIG. 3 illustrates a block diagram of the network traffic management device 110 in accordance with an aspect of the present disclosure. The network interface controller 200 within the network traffic management device 110 bridges data traffic between the host processor complex 218 and one or more network interfaces 204. As stated above, the host processor complex 218 includes the host processor 220 as well as one or more buffer memories 219 interconnected by one or more internal bus 217. It is contemplated that the host processor complex 218 can also include additional components, for example, additional processors, controllers and electronic circuitry to handle data. The network interface controller 200 connects to the host processor complex 218 over the packetized CPU bus 208. DMA services are provided between the network interface controller 200 and the host processor complex 218 via one or more DMA channels 227, 229. It should be noted that although only two DMA channels 227, 229 are shown in FIG. 3, any number of DMA channels are contemplated. Each DMA channel supports the movement of data traffic between the I/O devices and the buffer memory 219 in the host processor complex 218. One or more DMA channels 227 or 229, can access any of the attached I/O devices through the network interface controller 200's internal switching matrix.

As will be discussed in more detail below, the buffer memory 219 stores the received network packets from the network interface controller 200 and directional pointers that indicate the location in the buffer memory 219 of the stored packet. The host processor 220 accesses the buffer memory 219 via interrupts for direct memory accesses to data stored in different locations of the buffer memory 219 via the packetized CPU bus 208. Using DMA channels 227, 229, network packets received over the network 108 are written into the buffer memory 219 by the network interface controller 200 via the packetized CPU bus 208 after being split into constituent CPU bus packets. For transmitting network packets to the network 108 using DMA channels 227, 229, the CPU bus packets are read from buffer memory 219 and reassembled over the CPU bus 208 into network packets.

The DMA channels 227 and 229 are utilized to access the memory 219 of the network traffic management device 110. The network interface controller 200 in this example interfaces the processor 220 and buffer memory 219 via the packetized CPU bus 208 and to the network 108 via an Ethernet link 206. The network interface controller 200 provides multiple DMA channels 227, 229 that couple the interface port 202 at which network packets are received to the CPU bus interface 204. Network packets are segmented into smaller CPU bus packets and sent over the packetized CPU bus 208 in an interleaved manner for processing by the host processor complex 218.

The packetized CPU bus 208 used by the network interface controller 200 in this example segments and/or reassemble the network packets obtained from one or more of the DMA channels, e.g., DMA channels 227 and 229. The obtained network packets from the DMA channels 227 and 229 can be segmented and/or reassembled into smaller associated or constituent packets, e.g., HyperTransport packets, to be transmitted over the packetized CPU bus 208. In one example, the maximum CPU bus packet size is 64 bytes, but of course other sizes can be used for the CPU bus packet size. The network packets may be segmented into multiple CPU bus packets and sent across the packetized CPU bus 208. For example, a simple network packet of 128 bytes may be segmented into two HyperTransport packets, with each HyperTransport packet being 64 bytes. Of course, other segmenting schemes can be used depending upon the size of the network packet and the size of the individual HyperTransport packets. The number of HyperTransport packets needed to send the entire network packet is a function of the size of the network packet and the size of the HyperTransport packets.

Similarly, in the reverse direction for transmitting network packets from the network traffic management device 110 to client computers 106 or to servers 102 via network 108 or LAN 104, respectively, CPU bus packets are reassembled into network packets using DMA channels 227, 229 and transmitted via network port 202 over the Ethernet link 206. The DMA channels 227 and 229 in the network interface controller 200 maintains an independent segmentation and reassembly context. The CPU bus packet stream to and from each DMA channel 227 and 229 is fairly interleaved into at least one stream over the packetized CPU bus 208 based upon various schemes, e.g., round robin, by way of example only.

The buffer memory 219 includes a packet buffer area 224, which is non-contiguous, and a ring buffer area 226, which is dedicated contiguous memory space. In this example, the packet buffer area 224 is larger in capacity in comparison to the ring buffer 226, but has higher access cost memory such as in DRAM or related types of memory. In contrast, the ring buffer area 226 may be a faster access memory but is smaller in capacity in comparison to the packet buffer area 224. As shown in FIG. 3, data packets 228 and 230 are written and stored in the packet buffer area 224 of the buffer memory 219. Respective DMA descriptors 232 and 234 for the packets 228 and 230 are written by the network interface controller 200 and stored in the ring buffer area 226. As will be discussed in more detail below, the network interface controller 200 writes and stores a special DMA descriptor 236 into the ring buffer area 226 in which the special DMA descriptor 236 represents a data packet having connection status information. Although the packets 228 and 230 are shown written consecutively for convenience in FIG. 3, it is to be understood that the packets 228 and 230 may be written in any order in any part of the packet buffer area 224. The descriptors 232, 234, and/or special DMA descriptor 236 may be written, for example, in a linear order in the ring buffer area 226.

The special DMA descriptor 236 is used for a direct DMA feature for data packets that contain connection status information. In particular, the special DMA descriptor 236 contains the connection status information, and considering that the special descriptor 236 is written in the ring buffer area 226, the processor 220 can quickly access the ring buffer area 226 to obtain the connection status information without having to access the packet buffer area 224. The special DMA descriptor 236 functions the same as a normal DMA descriptor described above except the special DMA descriptor 236 is larger than the descriptor for a normal DMA. The special descriptor may be used to store certain information from the packet, however the entire packet is not copied into the descriptor. In an example, only the significant protocol state change information or connection status information is copied into the special DMA descriptor 236. Data packets that use direct DMA must meet the correct classification profile in that they include the correct protocol (TCP for example) and no payload data. Thus, the data packet having connection status information will be instantly and entirely processed by the host processor 220 rather than being stored in the packet buffer area 224 and later retrieved. In other words, by classifying the data packet based on its desired contents (here, connection status information) and associating a special descriptor to that data packet, the data packet is quickly and efficiently processed to achieve a performance gain in processing time, as discussed below.

Thus, the network interface controller 200 classifies the data packet upon reading the contents of the data packet to determine whether the packet includes connection state information, event information, error messages, or other information which is to be consumed immediately by the host processor 220. The network interface controller 200 will also write the special DMA descriptor 236 and store the special DMA descriptor 236 in the ring buffer area 226 of the memory 219. The network interface controller 200 will also notify the host processor 220 via an interrupt signal that the special DMA descriptor 236 has been written to the ring buffer area 226. A timer may be used to monitor the amount of time that the special DMA descriptor 236 remains in the ring buffer area 226. The special DMA descriptor 236 will store pure protocol information that will be immediately accessed and consumed or processed by the host processor 220. This avoids having to copy the user data out of the descriptor ring buffer 226 and store it somewhere else, such as expensive packet buffer area 224. The remaining portion of the data packets using the direct DMA are discarded by the network interface controller 200 and not transferred to the buffer memory 219.

The network interface controller 200 allows the host processor 220 to access the buffer memory 219. The packets 228 and 230 stored in the packet buffer area 224 of the memory 219 are referenced via pointers 242 and 244 which are stored in the respective DMA descriptors 232 and 234. Incoming packets with data in the payload field such as the packets 228 and 230 may be written to the packet buffer area 224 by the network interface controller 200 for handling by the appropriate processor in the host processor complex 218 via a normal DMA when an interrupt signal is sent. A pointer to the location of the packet in the packet buffer area 224 is stored with the respective DMA descriptors 232 and 234 of the stored packets 228 and 230. The pointers such as the pointers 242 and 244 are used to direct the host processor 220 to access the correct part of the packet buffer area 224 and retrieve the stored packets for processing.

In the case of a data packet that has connection state information, event information, error messages, or other information which is to be consumed immediately by the host processor 220, the direct DMA process utilized by the network interface controller 200 in the network traffic management device 110 eliminates the need for the host processor 220 to access the packet buffer area 224 to retrieve that information. The network interface controller 200 may classify the type of data packet as a normal data packet with an attached payload and handle the data packet normally without using direct DMA. However, if the network interface controller 200 determines the data packet to include connection state information 246 (such as SYN, ACK, FIN or RESET), event information, error messages, or other information which is to be consumed immediately by the host processor 220, the network interface controller 200 of the network traffic management device 110 writes the special DMA descriptor 236 containing that information into the ring buffer area 226. Upon notification, the host processor 220 needs only to access the ring buffer area 226 to retrieve the information which is to be consumed immediately.

In this example, the network interface controller 200 may inspect each packet and determine if the packet is a TCP connection state only packet. The network interface controller 200 may be configured to determine whether the packet contains event information, ICMP error messages, or any other information which needs to be consumed by the host processor 200. In the example in which the data packet contains TCP based connection status information, the network interface controller 200 extracts the applicable connection state information such as a SYN, ACK, FIN or RESET state indicator. A special DMA descriptor 236 is then created by the network interface controller 200 which writes the special DMA descriptor 236 into the ring buffer area 226 of the memory 219. The special DMA descriptor 236 contains the connection state information previously extracted from the data packet, but does not contain a packet buffer pointer since the full packet is discarded and not written in the packet buffer area 224.

The described process may result in a large performance gain in the network traffic management device 110 when the network traffic seen by the network traffic management device 110 includes a large number of connection state packets. The large performance gain results at least partially from the saving of internal bus bandwidth that does not need be used for accessing the packet buffer area 224. The gain also results from saving cache misses as the host processor 220 stops looking for access to the packet buffer area 224 because the special DMA descriptor 236 contains all the information the host processor 220 needs for that particular data packet. The performance gain also results from avoiding the expensive access to slower memory, such as DRAM or related types of memory, that is typically used for the packet buffer area 224.

Figure 4:
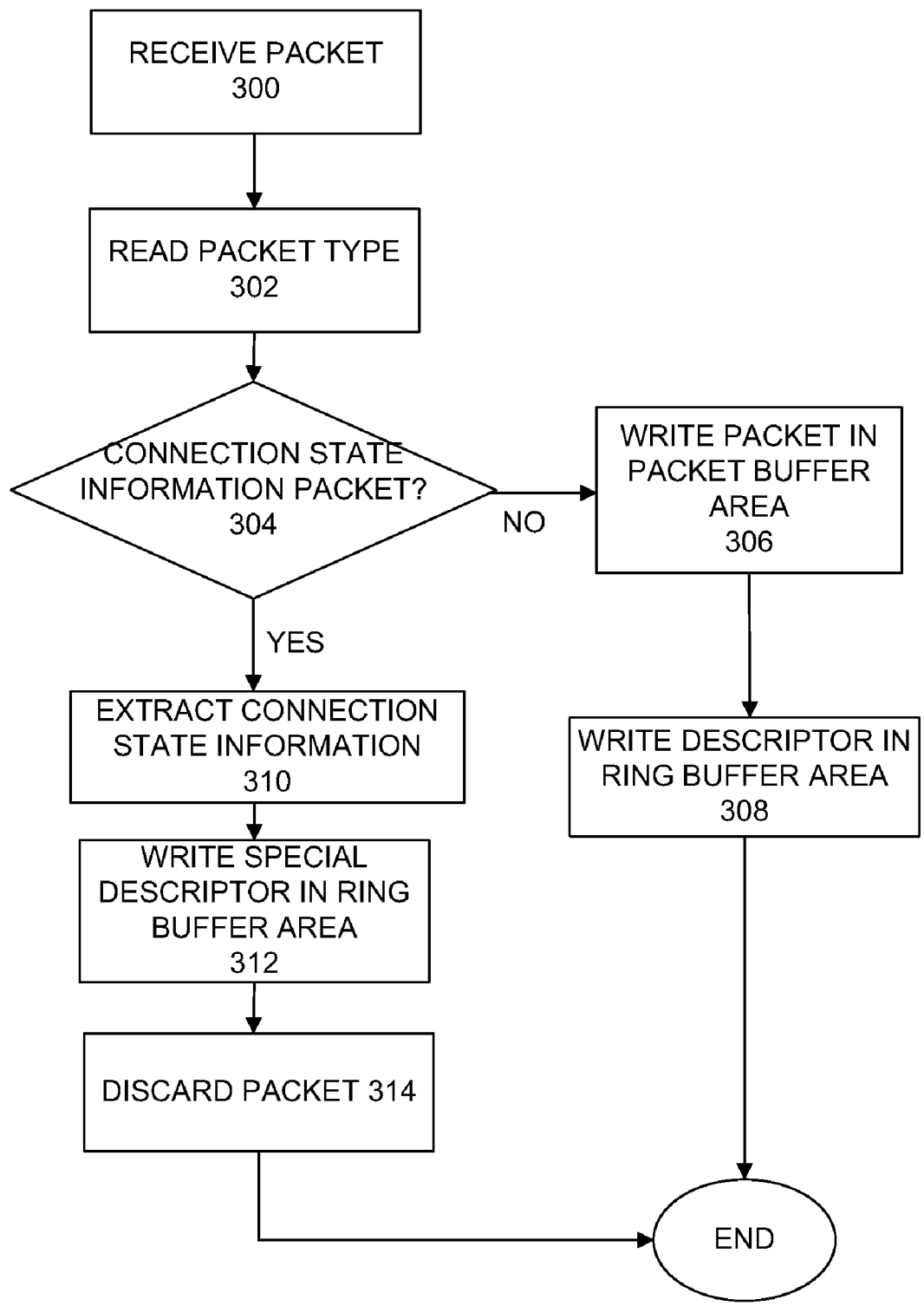
FIG. 4 is a flow chart of a method for optimizing received state connection packets for processing by the example network traffic management device in FIG. 1.
Figure 5:
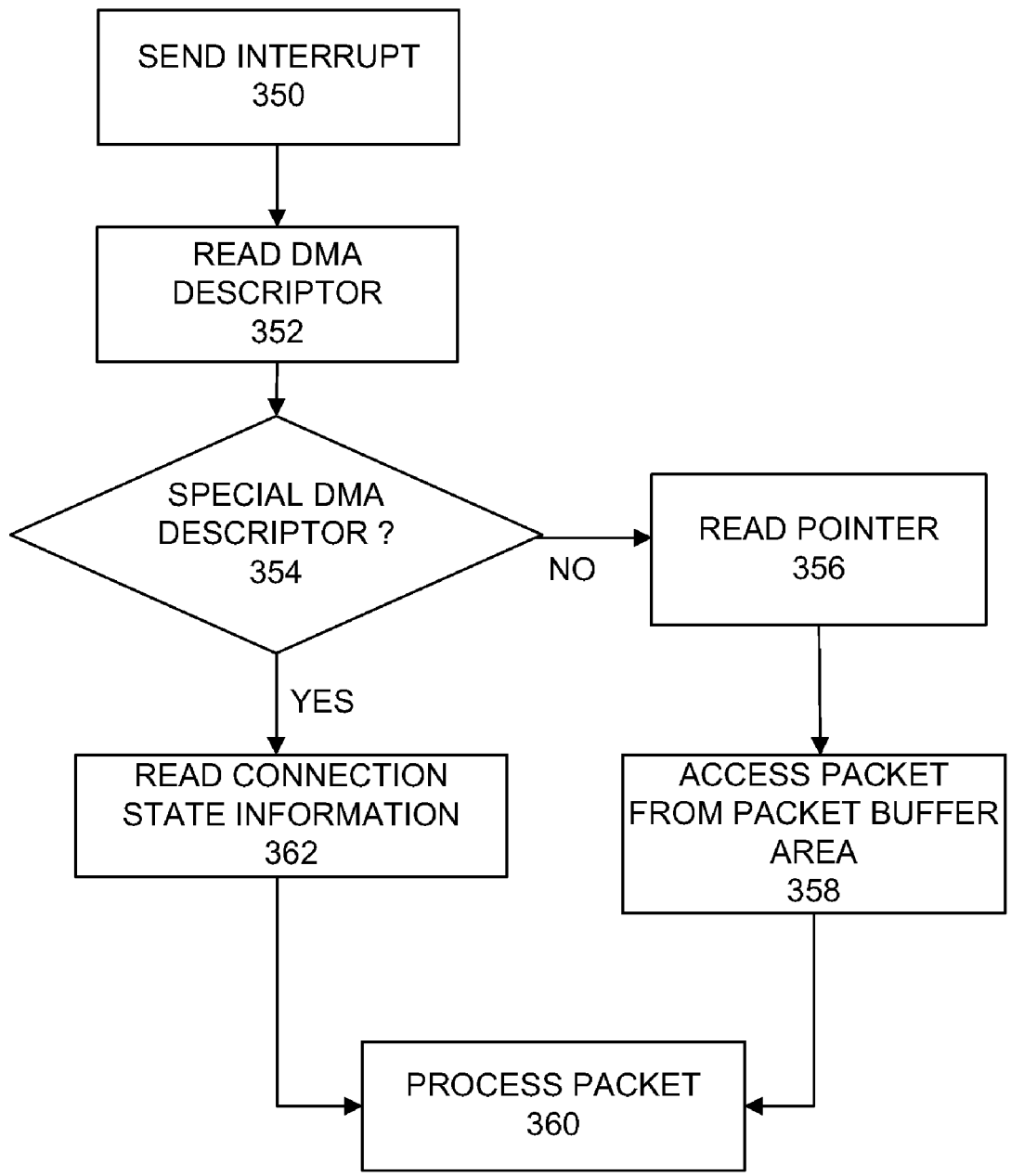
FIG. 5 is a flow chart of a method for direct DMA handling of different types of packets to avoid the host processor accessing the packet buffer area for state connection packets.

The operation of the example direct DMA process, which may be run on the network interface controller 200 of the network traffic management device 110, will now be described with reference to FIGS. 2 and 3 in conjunction with the flow diagrams shown in FIGS. 4-5. The flow diagram in FIGS. 4-5 is representative of example machine readable instructions for implementing the direct DMA process performed by the network interface controller 200 in the network traffic management device, and more particularly the packet DMA channels 227, 229. It should be noted that the functions are described herein as being performed by the network traffic management device 110 may be performed by the network interface controller 200, the host processor 220 or a combination of the two components.

FIG. 4 is a flow diagram of a method for optimizing received state connection packets for processing by the example network traffic management device 110 in accordance with an aspect of the present disclosure. In FIG. 4, the network traffic management device 110 receives one or more packets of data (block 300) and reads the packet type of the one or more packets of data (block 302) to classify the data packet based on whether the data packet contains information which is to be consumed immediately by the host processor 220. In the event that the data packet contains TCP based connection status information, he network traffic management device 110 determines whether the data packet contains the connection state information packet (block 304) (e.g. SYN, ACK, FIN or RESET). If the packet is not and/or does not contain a connection state information packet, the network traffic management device 110 will write the packet into the packet buffer area 224 of the memory 219 (block 306). The network traffic management device 110 will also write a DMA descriptor in the ring buffer area 226 along with a corresponding pointer which points to the location in the packet buffer area 224 where the written packet is contained (block 308). The network traffic management device 110 will then end the process.

However, if the network traffic management device 110 determines and classifies the data packet as having connection state information (block 304), the network traffic management device 110 will extract the connection state information from the packet (block 310). The network traffic management device 110 will then write the connection state information in a special DMA descriptor 236 which is written and stored in the ring buffer area 226 (block 312). The network traffic management device 110 will then discard the packet (block 314) and end the process. It should be noted that the above functions are generally described as being performed by the network traffic management device 110 may be performed by the network interface controller 200, the host processor 220 or a combination of the two components.

FIG. 5 is a flow diagram of the interrupt process initiated by the network traffic management device 110 to initiate the processing of a data packet or packets by the host processor 220. The network traffic management device 110 initiates the process by sending an interrupt signal to the host processor 220 to notify the host processor 220 that a data packet has been written to the buffer 219 (block 350). In response to receiving the interrupt signal, the host processor 220 accesses the ring buffer 226 in the memory and reads the next DMA descriptor (block 352). The host processor 220 determines whether the DMA descriptor is a special DMA descriptor (block 354) as discussed above. If the host processor 220 determines that the identified DMA descriptor is not a special DMA descriptor 236, the host processor 220 will proceed to read the corresponding pointer in the DMA descriptor (block 356). The host processor 220 will then use the pointer to access the stored respective packet located in the packet buffer area 224 (block 358). The host processor 220 will then process the accessed data packet (block 360).

However, if the host processor 220 determines that the DMA descriptor is classified as a special DMA descriptor 236 (block 354), the host processor 220 will proceed to read the connection state information of that TCP packet contained in the special DMA descriptor 236 (block 362). The host processor 220 will then process the accessed connection state information (block 360) directly from the special DMA descriptor 236 without having to expend computational resources to access the packet buffer area 224 of the buffer memory 219 to retrieve this information. It should be noted that the above functions are generally described as being performed by the network traffic management device 110 may be performed by the network interface controller 200, the host processor 220 or a combination of the two components.

Having thus described the basic concepts, it will be rather apparent to those skilled in the art that the foregoing detailed disclosure is intended to be presented by way of example only, and is not limiting. Various alterations, improvements, and modifications will occur and are intended to those skilled in the art, though not expressly stated herein.

Although the above description is directed to connection status information in TCP packets, the system and method may be applied to any other protocols which have data packets that contain information which is to be immediately consumed in the network traffic management device. Such information includes, but is not limited to, event information, ICMP error messages, and the like. For example, different non-TCP based protocols that utilize DMA may use the described processes. Although, the examples above relate to networks, the processes may also be used for both network based and non-network based protocols such as storage protocols. Any protocol requiring the DMA of state information without bulk data may use the direct DMA process. These alterations, improvements, and modifications are intended to be suggested hereby, and are within the spirit and scope of the examples. Additionally, the recited order of processing elements or sequences, or the use of numbers, letters, or other designations therefore, is not intended to limit the claimed processes to any order except as may be specified in the claims.

What is claimed is:

1. A method for efficiently processing a received data packet, the method comprising:
   reading a received data packet to determine if the data packet contains connection state information;
   extracting the connection state information from the data packet if the data packet contains the connection state information;
   storing the connection state information as a special DMA descriptor in a ring buffer memory configured to be accessible by a host processor; and
   notifying the host processor by an interrupt signal that the special DMA descriptor has been stored in the ring buffer memory, wherein the host processor is able to immediately access the ring buffer memory to retrieve the stored connection state information from the special DMA descriptor.

2. The method of claim 1, wherein the data packet is a TCP data packet.

3. The method of claim 1, further comprising discarding the data packet after storing the connection state information in the ring buffer memory.

4. The method of claim 1, further comprising writing the connection state information as the special DMA descriptor prior to storing the special DMA descriptor in the ring buffer memory.

5. The method of claim 1, further comprising storing the data packet into a packet buffer area if the data packet does not contain the connection state information.

6. The method of claim 5, further comprising writing and storing a descriptor corresponding to the data packet in the ring buffer area if the data packet does not contain the connection state information.

7. A non-transitory computer readable storage medium having stored thereon instructions for efficiently processing a received data packet comprising machine executable code which when executed by at least one processor, causes the processor to perform steps comprising:
   reading a received data packet to determine if the data packet contains connection state information;
   extracting the connection state information from the data packet if the data packet contains the connection state information;
   storing the connection state information as a special DMA descriptor in a ring buffer memory configured to be accessible by a host processor; and
   notifying the host processor by an interrupt signal that the special DMA descriptor has been stored in the ring buffer memory, wherein the host processor is able to immediately access the ring buffer memory to retrieve the stored connection state information from the special DMA descriptor.

8. The non-transitory computer readable storage medium of claim 7, wherein the data packet is a TCP data packet.

9. The non-transitory computer readable storage medium of claim 7, further comprising discarding the data packet after storing the connection state information in the ring buffer memory.

10. The non-transitory computer readable storage medium of claim 7, further comprising writing the connection state information as the special DMA descriptor prior to storing the special DMA descriptor in the ring buffer memory.

11. The non-transitory computer readable storage medium of claim 7, further comprising storing the data packet into a packet buffer area if the data packet does not contain the connection state information.

12. The non-transitory computer readable storage medium of claim 11, further comprising writing and storing a descriptor corresponding to the data packet in the ring buffer area if the data packet does not contain the connection state information.

13. A network traffic management device comprising:
   one or more host processors;
   a buffer memory coupled to the one or more processors by a bus; and
   a network interface controller coupled to the one or more host processors and the buffer memory and capable of receiving and forwarding data packets from a network that relate to a plurality of applications;
   at least one of the one or more host processors configured to execute programmed instructions stored in the buffer memory and including logic configured to implement a process further comprising:
      reading a received data packet to determine if the data packet contains connection state information;
      extracting the connection state information from the data packet if the data packet contains the connection state information;
      storing the connection state information as a special DMA descriptor in a ring buffer memory configured to be accessible by the host processor; and
      notifying the host processor by an interrupt signal that the special DMA descriptor has been stored in the ring buffer memory, wherein the host processor is able to immediately access the ring buffer memory to retrieve the stored connection state information from the special DMA descriptor.

14. The network traffic management device of claim 13, wherein the data packet is a TCP data packet.

15. The network traffic management device of claim 13, wherein the at least one of the one or more host processors is further configured to execute programmed instructions stored in the memory and the network interface controller with logic is further configured to implement discarding the data packet after storing the connection state information in the ring buffer memory.

16. The network traffic management device of claim 13, wherein the at least one of the one or more host processors is further configured to execute programmed instructions stored in the memory and the network interface controller with logic is further configured to implement writing the connection state information as the special DMA descriptor prior to storing the special DMA descriptor in the ring buffer memory.

17. The network traffic management device of claim 13, wherein the at least one of the one or more host processors is further configured to execute programmed instructions stored in the buffer memory and the network interface controller with logic is further configured to implement storing the data packet into a packet buffer area if the data packet does not contain the connection state information.

18. The network traffic management device of claim 17, wherein the at least one of the one or more host processors is further configured to execute programmed instructions stored in the buffer memory and the network interface controller with logic is further configured to implement writing and storing a descriptor corresponding to the data packet in the ring buffer area if the data packet does not contain the connection state information.

19. The network traffic management device of claim 13, wherein the host processor is embodied in a Field Programmable Gate Array.

* * * * *